United States Patent [19]

Krowl

[11] Patent Number: 4,731,917

[45] Date of Patent: Mar. 22, 1988

[54] STAPLE GUN APPLICATION OF VINYL SIDING

[75] Inventor: Thomas R. Krowl, North Tonawanda, N.Y.

[73] Assignee: National Gypsum Company, Dallas, Tex.

[21] Appl. No.: 423,702

[22] Filed: Sep. 27, 1982

[51] Int. Cl.$^4$ .................. B23P 11/00

[52] U.S. Cl. .................. 29/432; 227/32

[58] Field of Search .................. 29/432; 227/32, 120, 227/130, 156

[56] References Cited

U.S. PATENT DOCUMENTS

| | | | |
|---|---|---|---|
| 2,637,030 | 5/1953 | Wickman et al. | 227/120 X |
| 2,918,675 | 12/1959 | Smith | 29/432 |
| 3,360,176 | 12/1967 | Gehl et al. | 227/156 X |
| 3,429,013 | 2/1969 | Pabich et al. | 29/432 X |
| 3,765,077 | 10/1973 | Pabich | 29/432 |
| 4,041,598 | 8/1977 | D'Angelo et al. | 29/432 |
| 4,087,035 | 5/1978 | Harmon | 227/156 X |
| 4,187,589 | 2/1980 | Jobe, II | 227/76 X |
| 4,235,017 | 11/1980 | Yavis | 227/156 X |
| 4,320,613 | 3/1982 | Kaufman | 52/309.8 X |
| 4,424,929 | 1/1984 | Weis | 227/32 |

OTHER PUBLICATIONS

Senco Fastening Systems Portable Air-Driven Nailing and Stapling Systems, a publication of Senco Products, Inc., 8485 Broadwall Rd., Cincinnati, Ohio 45244 order #336 (50WP679), pp. 1, 10 and 11.

*Primary Examiner*—Howard N. Goldberg
*Assistant Examiner*—Joseph M. Gorski
*Attorney, Agent, or Firm*—Robert F. Hause

[57] ABSTRACT

A pneumatically operated staple gun with an adjustably spaced away elongate guide shoe allows control, with fine adjustment, of depth of penetration of staples, when stapling, through nailing slots of vinyl siding, into thick low density insulating boards. Shoe includes slot locating means in one embodiment.

5 Claims, 3 Drawing Figures

STAPLE GUN APPLICATION OF VINYL SIDING

This invention relates to the stapling of elongate strips of vinyl siding and is directed particularly to a modified powered staple gun and to the method of applying vinyl siding employing the modified staple gun.

Vinyl siding is commonly applied as a building exterior surface over subsurfaces of many varying types of material, including low density wood fiber insulation board, very low density plastic foam insulation board or relatively high density wood such as plywood. The vinyl siding is normally attached to the subsurface by nails or staples.

The use of staples commonly involves the use of a pneumatically actuated staple gun, inserting one staple leg into the subsurface through a nailing slot in the top edge of the vinyl siding and inserting the other staple leg into the subsurface at a location above the top edge of the siding, with the staple crown extending across the section of siding at the top edge of the siding immediately above the nailing slot.

Because vinyl siding expands and contracts with changes in temperature, it is known that, in stapling on the siding, the staple crown must be close to, but not tightly against, the section of siding top edge under the staple crown, so that the siding is always free to move in the lengthwise direction.

It is an object of the present invention to provide a power staple gun which will permit close control of the partial penetration of staples into various types of subsurface.

It is a further object to provide an improved method of applying vinyl siding, employing such a staple gun.

These and other objects and advantages of the invention will be more readily apparent when considered in relation to the preferred embodiments as set forth in the specification and shown n the drawings in which.

Figure 1:
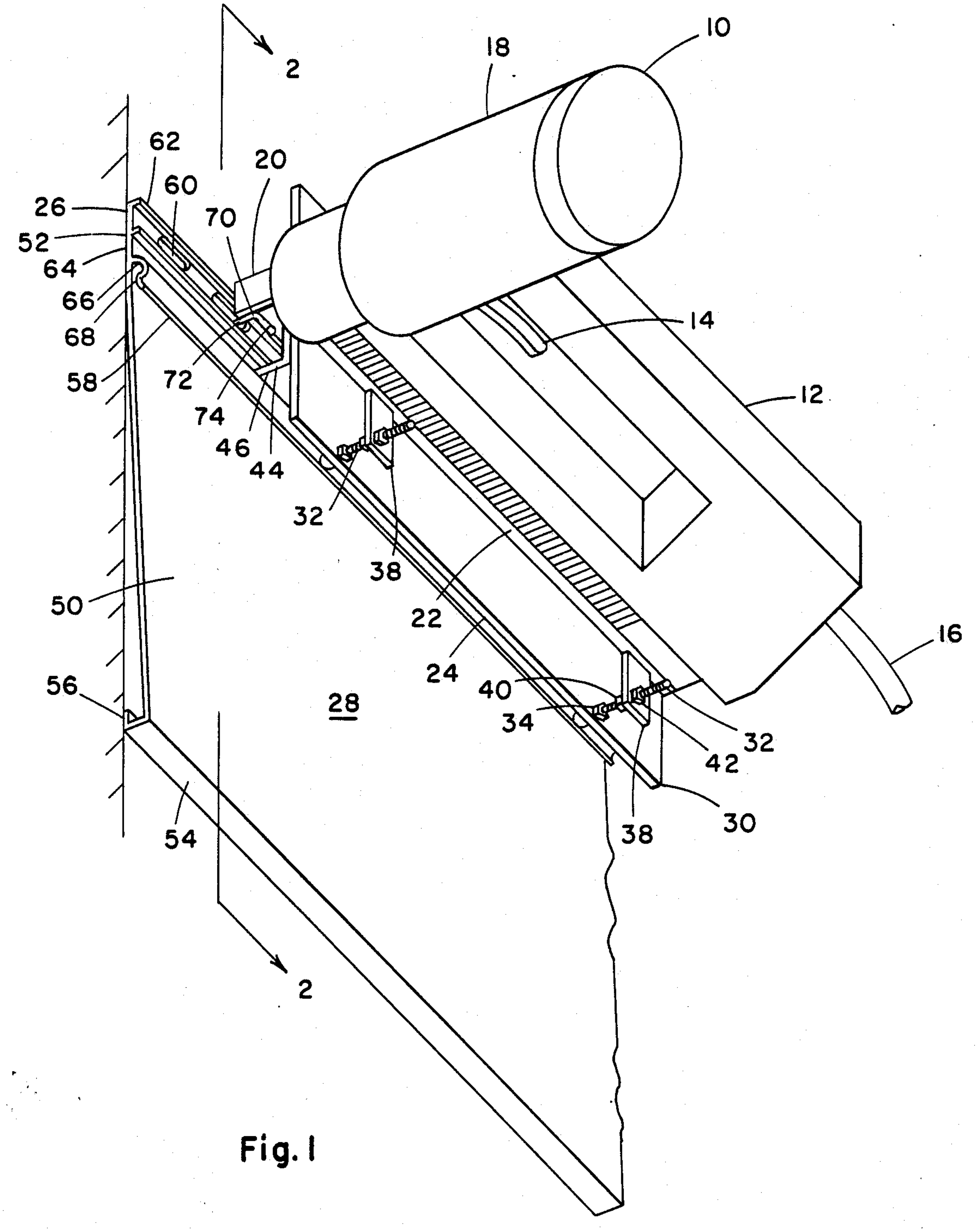
FIG. 1 is a perspective view of a power driven stapler affixing vinyl siding to a subsurface, in accordance with the invention.
Figure 2:
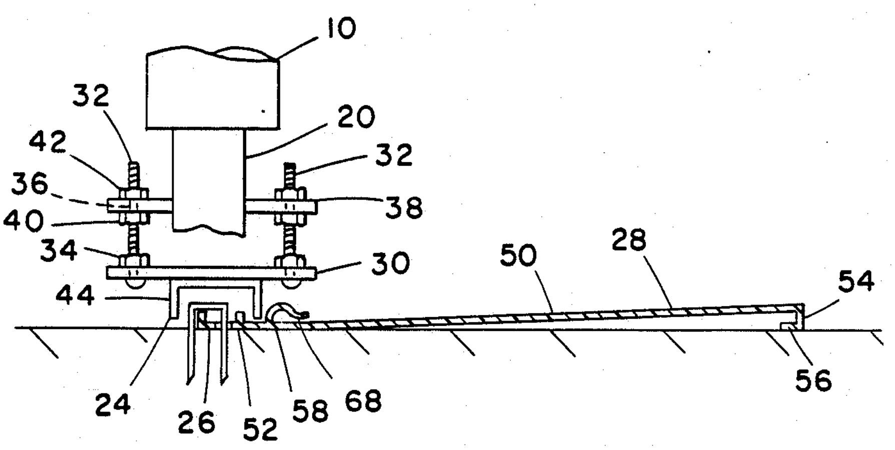
FIG. 2 is a sectional view of a portion of the stapler and a portion of the vinyl siding taken on line 2—2 of FIG. 1.

Referring to FIGS. 1 and 2, there is shown a staple gun 10. Staple gun 10 includes a handle 12, trigger 14, high pressure air hose connector 16, air cylinder portion 18, staple outlet 20, staple supply rack 22, and suspended therebelow a staple gun shoe 24. Staple gun shoe 24 is shown disposed in the upper attachment portion 26 of a strip of vinyl siding 28. With exception of the shoe 24, staple gun 10 is preferably a Model M-II Senco heavy duty stapler, made by Senco Fastening Systems.

Shoe 24 consists of an elongate flat metal plate 30 which is suspended from the bottom of the staple supply rack 22 by four long metal screws 32, located at each of the four corners of plate 30. Each screw 32 has an attaching nut 34 affixing the screw 32 rigidly to plate 30. Each screw 32 extends upward from plate 30, through a hole 36 in an outwardly extending extension 38 of the bottom of the staple supply rack 22, near each of the four bottom corners of the rack 22. Also on each screw 32 is a lower locking nut 40, located firmly against the bottom side of extension 38, and an upper locking nut 42, located firmly against the top side of extension 38. Raising or lowering of plate 30 can be accomplished with fine precision by raising or lowering locking nuts 40 and 42 on screws 32.

Affixed to the bottom of plate 30 is an elongate channel 44, forming the bottom of shoe 24. Channel 44 has two parallel downwardly extending flanges 46 which are disposed in contact with the portion 26 of siding 28.

Vinyl siding 28 is produced by extruding elongate integral sections of about 10 to 20 feet in length, having a shape to simulate wood lap siding. The siding 28 includes a main face portion 50, a top concealed portion 52, and a bottom perpendicular spacer flange 54 and, at the outermost end thereof, an upwardly extending short interlock flange 56.

The top concealed portion 52 includes, in addition to the upper attachment portion 26, a lower interlock receiver channel 58, opening downwardly, for the reception of an interlock flange 56 of the siding section located immediately thereabove. The attachment portion 26 includes a plurality of spaced apart longitudinally aligned, elongated nailing slots 60. Slots 60 are disposed between two spaced parallel guide ribs 62, provided to assist an applicator, while nailing, to prevent driving the nail in until it is tight. These ribs 62 are of no value in staple application.

The interlock receiver channel 58 is formed of an "h" section, in which the long leg 64 connects the attachment portion 26 to the face 50, and a short horizontal leg 66 and an outer downward leg 68 coact with the long leg 64 to form the downwardly opening channel 58.

Typically, the face portion 50 is about eight to ten inches wide, the long leg 64 is about three-fourths of an inch wide and the attachment portion 26 is about a half-inch wide. The nailing slots 60 are about 5/32" wide and one inch long, with a spacing of about one inch between adjacent slots. An elongate strip of vinyl siding 28 is placed over relatively low density insulation board, the base material shown in FIG. 1, which forms the exterior subsurface of a building.

As staples are being shot by the staple gun in mounting vinyl siding 28, one of the flanges 46 is disposed to rest atop the short horizontal leg 66 of interlock receiver channel 58, providing some support for the six pound typical weight of gun 10. The staple outlet 20 is located at the forward end of gun 10, generally aligned with channel 44. At each side of outlet 20, and rearward about a half inch, is an L-shaped pin 70.

As staples are being shot, the lower of the two pins 70 is disposed so that one leg 72 of the pin is at the end of a slot 60 nearest shoe 24, and the other leg 74 of the pin extends toward shoe 24. Which of the two pins 70 will be the lower will depend on whether the handle 12 is to the right of the staple outlet 20 or to the left. With right-handed applicators, the handle will, as often as practical, be to the right.

With the lower pin 70 in the end of a slot 60, a staple shot from gun 10 will be properly positioned with one leg in the center of slot 60 and the other leg above the top edge of the siding 28.

Prior stapling of vinyl siding, with a gun having no shoe, depended solely on the leg 74 of the lower pin 70 for establishing how close the staple outlet was to the siding during stapling. The leg 74 of lower pin 70 was always placed firmly against the surface of the vinyl siding.

With the addition of shoe 24, the distance between the staple outlet 20 and the siding attachment portion 26 can be very accurately controlled and varied, by adjustment of the location of nuts 40 and 42 on screws 32.

Figure 3:
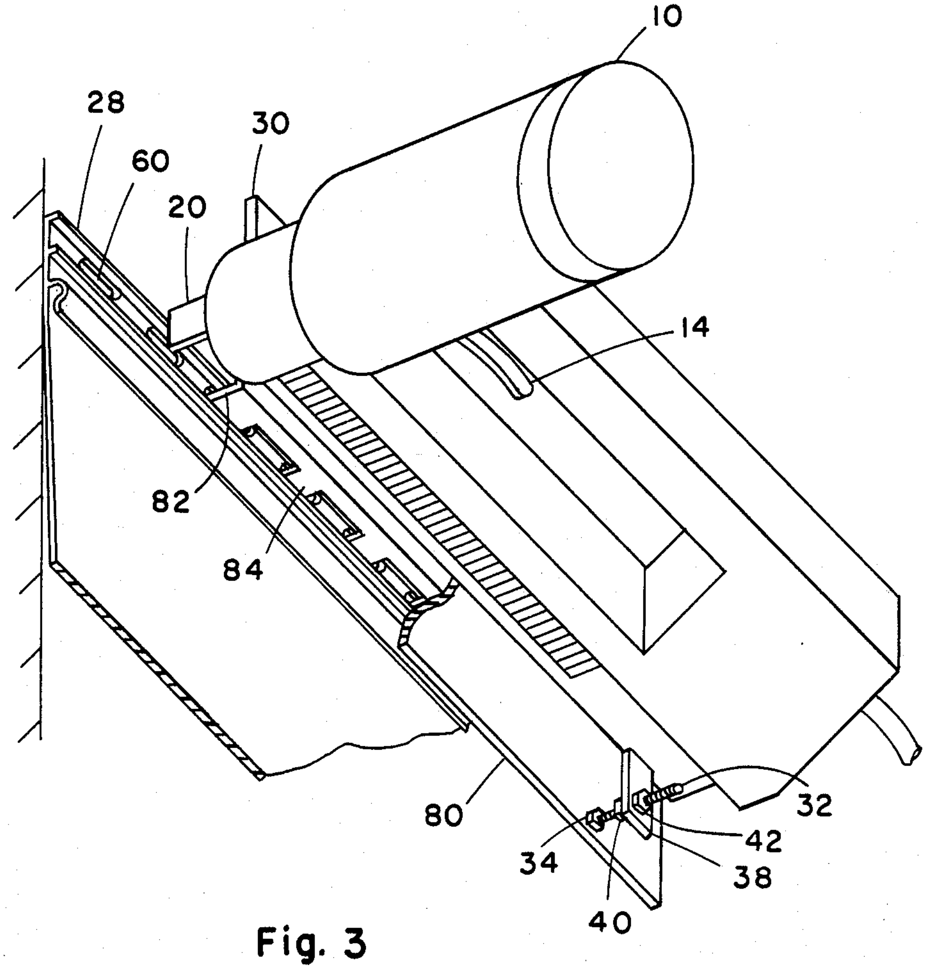
FIG. 3 is a perspective view of a modified form of the stapler shoe; in accordance with the invention.

Referring to FIG. 3, a modified form of staple gun shoe 80 is shown having channel flanges 82 with a plurality of downwardly extending tongues 84. Tongues 84 are slightly shorter than the nailing slots 60 in the siding 28, and spaced apart equal to the spacing of slots 60. With shoe 80, all aspects of the location of the staple outlet relative to the siding during stapling are controlled by the shoe 80. One of the two channel flanges 82 is placed so that its tongues 84 are all disposed in nailing slots 60 prior to firing the gun with trigger 14. Shoe 80 includes screws 32 and lower and upper locking nuts 40, 42 for gauging the distance of the staple outlet 20 from the siding 28, which provides a fine adjustment of how deep the staples penetrate a subsurface.

Having completed a detailed description of the preferred embodiments of my invention, so that others skilled in the art may practice the same, I contemplate that variations may be made without departing from the essence of the invention or the scope of the appended claims.

I claim:

1. The method of applying vinyl siding over relatively low density insulation board comprising the steps of placing an elongate strip of vinyl siding, having a plurality of longitudinally aligned, elongated nailing slots, over said insulation board forming the exterior flat subsurface of a building, placing a powered staple gun in position to fire a staple so that one staple leg will extend through one of said nailing slots in the siding top edge portion and the other staple leg will be disposed above the top edge of said siding, said staple gun having an adjustable shoe firmly held relative to said siding adjustably fixing the distance from the staple outlet to the vinyl siding between said nailing slot and said siding top edge, firing said staple gun so as to place a staple through said insulation board, and repeating as necessary.

2. The method of claim 1 wherein said shoe has an elongate siding contacting portion and wherein said placing step comprises the further step of disposing said siding contacting portion against a horizontally extending top edge portion of said siding.

3. The method of claim 2 wherein said siding has a downwardly opening interlock receiver channel extending in spaced parallel relation to said siding top edge and wherein said placing step comprises the further step of disposing said siding contacting portion against the top edge of said interlock receiver channel, providing a partial support for the weight of said gun.

4. The method of obtaining a penetration of staples into a low density substrate to a very uniform depth which, when one staple leg extends through a vinyl siding nailing slot and the other leg is disposed above the vinyl siding top edge, the staple crown holds the vinyl siding against the low density substrate without restricting sideways movement of the siding resulting from expansion and contraction, comprising the steps of the method of claim 1, followed by the steps of adjusting the distance from the staple outlet to the vinyl siding by adjusting the position of said shoe on said gun, with the greater the distance providing the lesser the penetration of staple, and firing the necessary number of staples into said subsurface after each of the necessary number of readjustments of said distance by readjustments of said shoe on said gun.

5. The method of claim 4 wherein said adjustment of said shoe on said gun comprises the further steps of shifting the location of a plurality of locking nuts on a plurality of screws which affix said shoe to the other portions of said gun.

* * * * *